J. A. OSTENBERG.
EARTH TILLING MACHINE.
APPLICATION FILED NOV. 1, 1916.
1,255,331.
Patented Feb. 5, 1918.
4 SHEETS—SHEET 1.
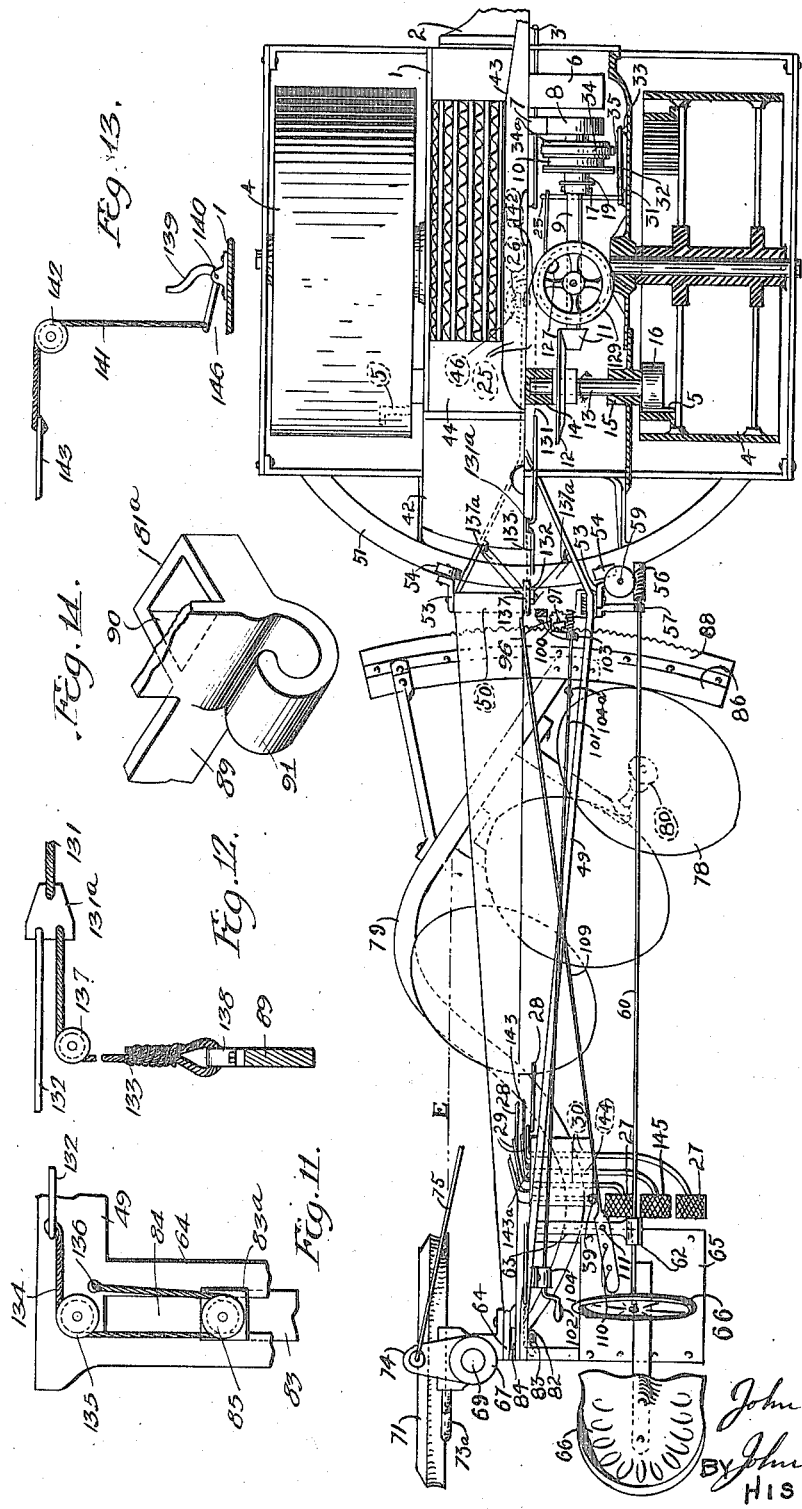
INVENTOR
John A. Ostenberg
BY John A. Naismith
HIS ATTORNEY J. A. OSTENBERG.
EARTH TILLING MACHINE.
APPLICATION FILED NOV. 1, 1916.
1,255,331.
Patented Feb. 5, 1918.
4 SHEETS—SHEET 2.
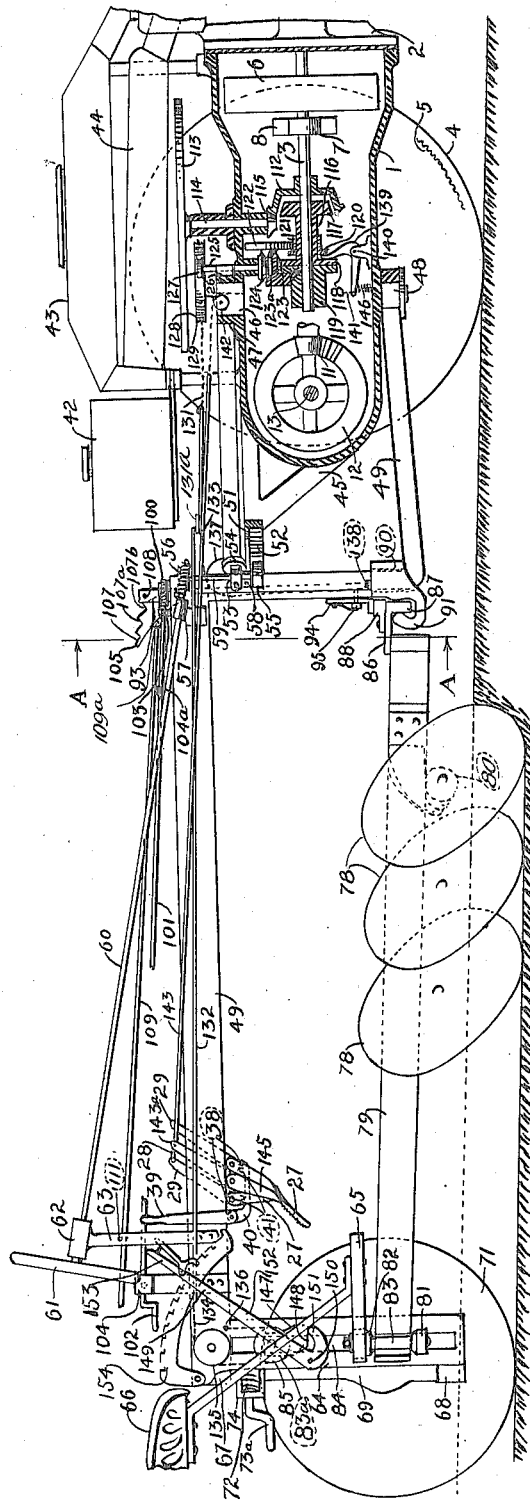
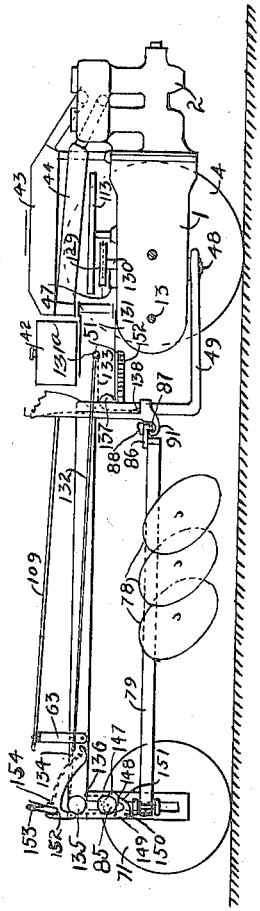
INVENTOR
John A. Ostenberg
BY John A. Naismith
HIS ATTORNEY

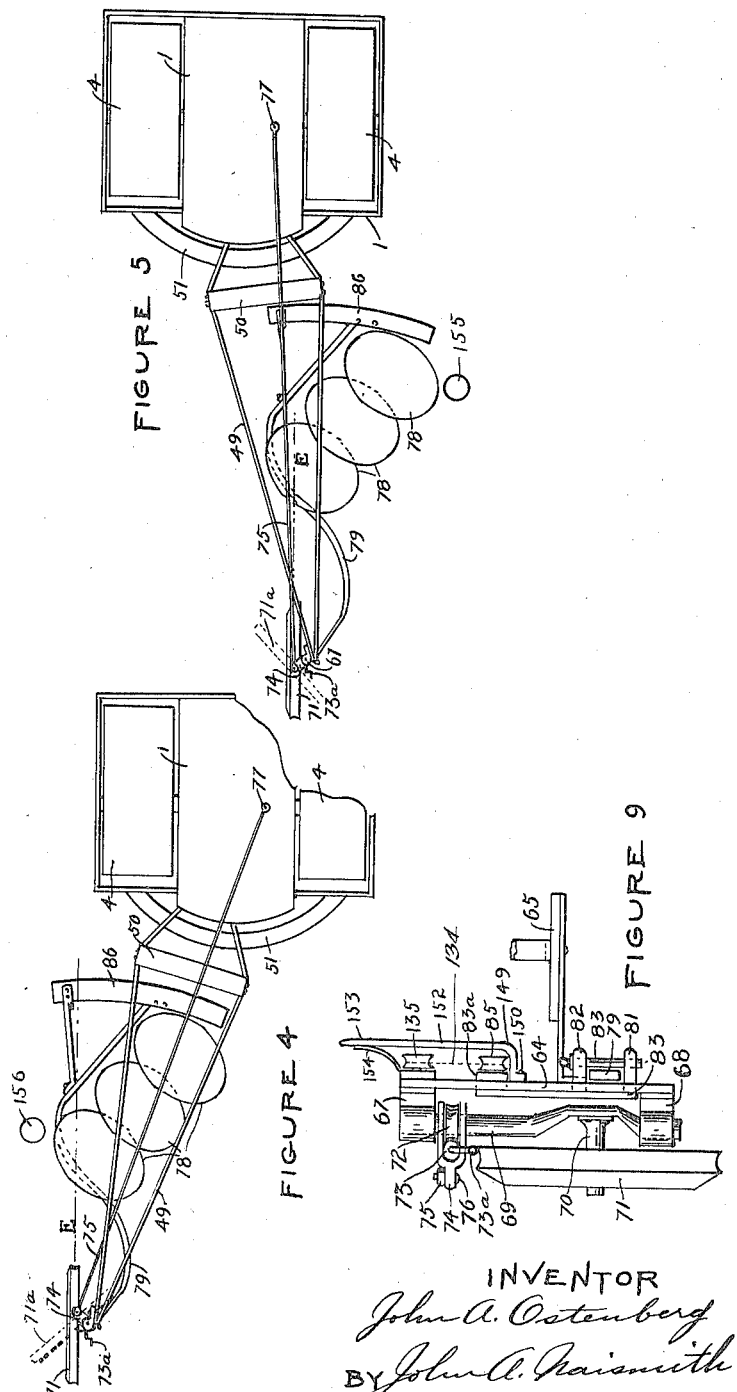

J. A. OSTENBERG.
EARTH TILLING MACHINE.
APPLICATION FILED NOV. 1, 1916.
1,255,331.
Patented Feb. 5, 1918.
4 SHEETS—SHEET 4.
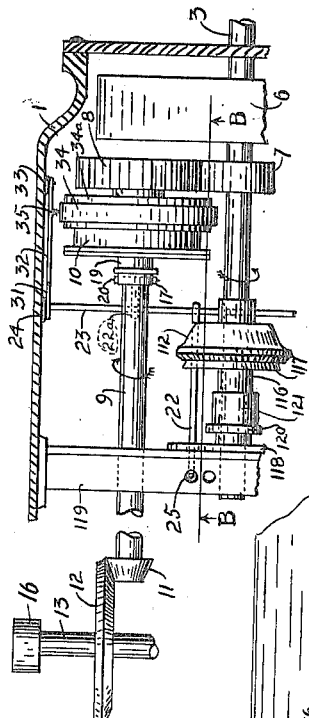
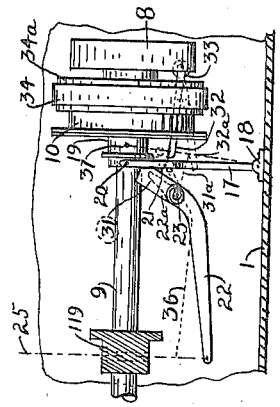
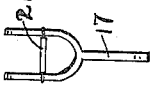
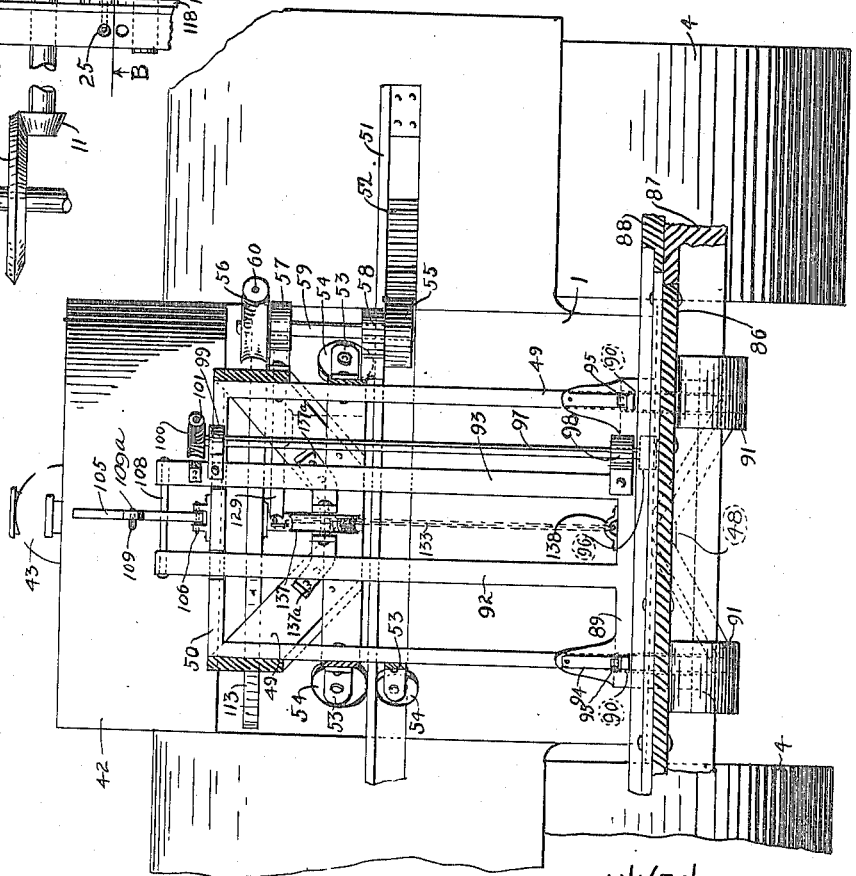
INVENTOR
John A. Ostenberg
BY John A. Naismith
HIS ATTORNEY

UNITED STATES PATENT OFFICE.

JOHN A. OSTENBERG, OF CAMPBELL, CALIFORNIA.

EARTH-TILLING MACHINE.

1,255,331.　　　　　Specification of Letters Patent.　　Patented Feb. 5, 1918.

Application filed November 1, 1916. Serial No. 128,932.

*To all whom it may concern:*

Be it known that I, JOHN A. OSTENBERG, a citizen of the United States, and resident of Campbell, in the county of Santa Clara and State of California, have invented certain new and useful Improvements in Earth-Tilling Machines, of which the following is a specification.

My invention relates broadly to earth tilling machines and more particularly to that class of machines which are used for plowing, cultivating, and so forth, and the objects of my invention are to provide a motor driven earth tilling machine, 1st, in which the tilling implement may be adjusted to various positions relative to the surface of the ground; 2nd, in which the tilling implement may be adjusted to work the ground on any line parallel with the longitudinal axis of the machine and lying within the working range of said implement; 3rd, in which a third or furrow wheel may be so adjusted that the tilling implement will automatically shift from one working position to another and be automatically positioned parallel to the longitudinal axis of the machine; 4th, in which the tilling instrument may be horizontally adjusted without changing the relative positions of the furrow and drive wheels; 5th, in which the tilling implement is placed between the drive wheels and the furrow wheel and thereby a short wheel base secured and the entire machine placed in front of the operator; 6th, in which the tilling implement is adjustably positioned so as to effectively work the ground close to the trunks of the trees in an orchard on whichever side of the machine they may be; 7th, in which the third or furrow wheel may be adjusted in a proper working position relative to the tilling implement in its various positions.

With the above and other objects in view, the invention consists in the novel and useful provision, formation, construction, combination, relative arrangement and interrelation and association of parts, members and features, all as hereinafter described, shown in the drawing and finally pointed out in the claims.

In the drawings:—

Figure 1 is a plan view of my invention, partly in section and part broken away.

Fig. 2 is a side elevation of my invention, partly in section and part broken away, showing the tilling implement in working position.

Fig. 3 is a reduced side elevation of my invention, partly in section and parts omitted, showing the tilling implement removed from working position.

Fig. 4 is a diagrammatical plan view of my invention showing the tilling implement shifted to the limit of its movement to one side of the machine, part broken away.

Fig. 5 is a diagrammatical plan view of my invention showing the tilling implement shifted to the limit of its movement to the opposite side of the machine.

Fig. 6 is a sectional view on line A—A of Fig. 2 parts broken away.

Fig. 7 is an enlarged plan view of the transmission mechanism connecting the main shaft and the driving shaft of one drive wheel.

Fig. 8 is a sectional view on line B—B of Fig. 7.

Fig. 9 is a rear end view of the frame which carries the tilling implement and the parts immediately connected thereto.

Fig. 10 is a front elevation of the forked arm which operates the clutch.

Fig. 11 is a detail elevation showing a portion of the mechanism for vertically adjusting the rear end of the frame carrying the tilling implement. Fig. 12 is a detail illustration showing a portion of the mechanism for vertically adjusting the forward end of the frame carrying the tilling implement. Fig. 13 is a detail illustration showing a portion of the mechanism for operating the clutch by means of which the mechanism for vertically adjusting the frame carrying the tilling implement is thrown into or out of operation. Fig. 14 is a perspective view of a portion of the frame used in vertically adjusting the forward end of the frame carrying the tilling implement.

Similar characters of reference refer to similar parts throughout the several views.

In describing the construction of this invention the subject falls naturally into two divisions, viz.—the draft engine and the frame pivotally connected thereto and carrying the furrow wheel and the tilling implement.

The draft engine comprises a main structure 1 having motor 2 mounted on the forward portion thereof operating shaft 3, and drive wheels 4 revolubly mounted thereon and provided with internal gears 5. Since each drive wheel is operated independently of the other the description of one will apply equally as well to the other.

On main shaft 3 is shown fly-wheel 6 and gear 7. Gear 7 meshes with gear 8 connected to driving shaft 9 by a clutch 10. A bevel gear 11 on shaft 9 meshes with gear 12 on shaft 13 operating in bearings 14 and 15, a gear 16 on shaft 13 meshing with internal gear 5 on wheel 4. At 17 is shown a forked arm pivoted at its lower end 18 to structure 1 and having its upper forked end pivotally connected to sleeve 19 by pin 20. In forked arm 17 is mounted roller 21 against which operates a short arm 22$^a$ mounted on shaft 23 operating in bearings 24 in structure 1, shaft 23 being rocked as desired by lever 22 secured thereto. To lever 22 is fastened a cable 25 passing upwardly through structure 1 and over pulley 26 revolubly mounted in structure 1. Cable 25 is operated by pedal 27 through the medium of rod 28 and lever 29 in bearing 30. Secured to rocker shaft 23 is arm 31 adapted to engage the end of lever 32 which is pivoted at 33 and to which member 34 of planetary reverse 34$^a$ is secured at 35. With the parts as shown in solid lines in Figs. 7 and 8 the shafts are driven in the direction indicated by the arrows and the engine is made to travel forward, the connections from shaft 3 to the opposite wheel 4 being a duplicate of the connection described. A pressure upon pedal 27 causes lever 22 to assume the position indicated by dotted line 36, the end thereof operating against roller 21 and forcing sleeve 19 inwardly to the position indicated by dotted line 37. An ordinary form of clutch being used shaft 9 is disengaged and ceases to revolve. The form of the end of the lever 22 as shown is such that a further movement of the same merely holds sleeve 19 in position but the resulting further movement of rocker shaft 23 causes arm 31 to engage the end of lever 32 thereby forcing said lever downward and tightening member 34 with the resulting reversal of motion of shaft 9 and the parts geared thereto. It may now be easily seen that by manipulating pedals 27 simultaneously the engine may be driven forward or backward. By operating said pedals 27 singly the engine may be turned in either direction. The pedals 27 are locked in a neutral position by providing lugs 38 thereon and pivotally mounting a lever 39 adjacent thereto, said lever 39 having an arm 40 provided with lugs 41 adapted to engage said lugs 38, so that when pedals 27 are pressed to a neutral position lever 39 may be thrown over by hand until said lugs 38 and 41 engage each other and said pedals held securely in position.

At 42 is indicated a fuel tank, 43 a water tank, at 44 a radiator and at 45 a frame rigidly secured to structure 1.

In the upper surface of structure 1 is provided an opening 46 in which pulley 26 is mounted, the flange around said opening forming a pivot 47. On the lower surface of said structure 1 is formed a second pivot 48 in alinement with pivot 47. On pivots 47 and 48 is mounted frame 49 connected by top bar 50. Frame 49 is pivotally adjusted on frame 45 in the following manner. Frame 45 supports an outermost horizontal angle iron 51 having a rack 52 formed therein. Rigidly secured to frame 49 are bearings 53 on which are revolubly mounted rollers 54, two of said rollers operating on the upper side of said angle iron 51 and one on the under side thereof. Rigidly mounted on frame 49 is a pinion 55 in mesh with rack 52 and operated by worm gear 56 supported on bearings 57 and 58 respectively through the medium of vertical shaft 59. Worm gear 56 is operated by rod 60 and hand wheel 61, supported by gearing 62 mounted on arm 63 which is in turn mounted on the outer end of frame 49. The angle of worm gear 56 should be such that when frame 49 is swung around on frame 45 through the action of the driving wheel as hereinafter described, it will run freely and easily.

To the rear end of frame 49 is rigidly secured a vertical member 64 to which is secured a foot board 65 carrying a seat 66. Rigidly secured to member 64 are bearings 67 and 68 respectively in which is mounted shaft 69, shaft 69 carrying an axle 70 on which is mounted furrow wheel 71. Rigidly secured to the upper portion of shaft 69 is worm gear 72, the worm 73 being journaled in arm 74 which is revolubly mounted on said shaft 69 and operated by handle 73$^a$. A rod 75 is connected at one end to arm 74 by pin 76 and at the other end to structure 1 of the engine by pin 77. Pin 77 is so positioned with relation to the center of the engine as to place one end of rod 75 on the opposite side of the axial line of said machine from pin 76. The operation of this mechanism will be described in conjunction with that of the tilling implement, which I will now take up.

The tilling implement 78, in this case represented by a plurality of disk plows, is mounted on a suitably formed beam 79 in any suitable manner as indicated by dotted lines at 80. In the instance here illustrated beam 79 provides a long straight shank upon which the disks are mounted and a reversed curve tail piece curving backwardly to member 64 where it is held loosely between lugs 81 and 82 by pin 83, lugs 81 and 82 being attached to bar 83 and slidably mounted in slot 84 formed in said member 64. To the upper portion of bar 83 is formed a lug 83ᵃ projecting through slot 84 and on which a pulley 85 is mounted for the purpose hereinafter described. To the forward end of beam 79 is rigidly secured a segmental angle iron 86, one flange of said iron being turned downwardly as shown at 87. A rack 88 is fastened to the upper surface of said angle iron 86. At 89 is shown a horizontal bar provided with rearwardly projecting lugs 89ᵃ having vertical slots 90 adapted to engage the vertical members of frame 49, depending hooks 91 adapted to engage flange 87 of angle iron 86, and vertical members 92 and 93 respectively in the relative positions shown. Stops 94 are held in position on bar 89 by spring bolts 95 to prevent flange 87 of angle iron 86 from jumping out of hooks 91.

Pinion 96 meshes with rack 88 and is operated by shaft 97 mounted in bearings 98 and 99 respectively, shaft 97 being in turn operated by worm gear 100 attached thereto. Worm gear 100 is operated by rod 101 and handle 102, rod 101 being mounted in bearings 103 and 104. Bearing 104 is a swivel bearing because since the worm gear 100 and the parts connected thereto must necessarily rise and fall with the vertical adjustment of tilling implement 78, rod 101 must have a pivotal movement on bearing 104, and for the same reason a universal joint is provided in rod 101 at 104ᵃ. At 105 is shown a stop bar pivotally mounted on bar 50 of frame 49 by pin 106 and having a number of notches as 107—107ᵃ—107ᵇ formed in its forward edge and adapted to engage rod 108 connecting bars 92 and 93. Stop bar 105 is thrown forward or backward by rod 109 attached thereto at one end by pin 109ᵃ and has a plurality of holes 110 in the opposite end adapted to engage pin 111 set in support 63.

When the plows 78 are at work, furrow wheel 71 follows in the furrow of the last plow as indicated by dotted line E in Figs. 1—4 and 5; therefore it is desirable to provide a means for raising beam 79 and the parts attached thereto so the implement will be clear of the ground when furrow wheel 71 is riding the surface of the ground, and it is also necessary to provide a mechanism for holding said beam in said raised position as well as to provide for the lowering of the same and the adjustment of said implement when lowered.

For raising implement 78 and the parts attached thereto I provide a clutch 112 secured to main shaft 3 and to which is operatively connected fan 113 by shaft 114 and gear 115. Sleeve 116 is slidably mounted on shaft 3 and carries the male portion 117 of clutch 112, and friction head 118 adapted to engage the side of bearing 119. On sleeve 116 is also formed a flange 120 and gear 121. Meshing with gear 121 is gear 122 carrying bevel gear 123 and mounted in bearing 124ᵃ. Meshing with bevel gear 123 is bevel gear 124 operating shaft 125 mounted in bearing 126 and carrying pinion 127. Pinion 127 meshes with an internal gear 128 in pulley wheel 129, wheel 129 operating in a horizontal plane in bearing 130. Secured to wheel 129 is cable 131 to which are secured rod 132 and cable 133 through the medium of plate 131ᵃ. To rod 132 is connected a second cable 134 which passes over pulley 135 mounted on the rear end of frame 49, and under pulley 85, and is secured at its end to frame 49 at point 136. Cable 133 operates over pulley 137 mounted in bearings 137ᵃ in frame 49 and is attached to bar 89 as shown at 138. At 139 is shown a bell crank pivoted at 140 and having one arm thereof extending upwardly into engagement with sleeve 116, the other arm being connected by cable 141 operating over pulley 142 to rod 143 and lever 143ᵃ which is mounted in bearing 144 and operated by pedal 145. If, now, pedal 145 is pressed forward the male portion 117 of clutch 112 is thrown forward into engagement with the female portion of said clutch by means of the mechanism just described, and through the gear connections above set forth wheel 121 is caused to revolve and wind up cable 131. Winding up cable 131 operates cable 133 on pulley 137 and cable 134 on the two pulleys 135 and 85, thereby drawing bar 89 and the parts attached thereto upward. Releasing pedal 145 permits spring 146 to operate bell crank 139 in the opposite direction and friction head 118 is forced against bearing 119 and the above described cable operating mechanism and the parts moved by said cables are held in position.

Stop bar 105 hereinbefore described forms a means of supporting the forward end of beam 79 in the desired position and the following described mechanism forms an adjustable stop for the rear end of the same. An arm 147 is secured to lug 83 having a flat lower edge 148. A lever 149 is pivoted to member 64 at 150 and is provided with a short upwardly curving leg 151 adapted to engage edge 148 in arm 147, and a long arm 152 provided with a handle 153 and locking device 154. This adjustable stop for the rear end of beam 79 is desirable as a gage for determining the depth to which the plows shall operate. When beam 79 has been raised sufficiently and stops 105 and 151 adjusted as desired, friction head 118 may be released from its pressure against bearing 119 by a pressure upon pedal 145 and said beam permitted to settle by gravity to the position for which said stops are set.

The construction and operation of the various mechanisms now having been described in detail, I will describe in a broader way the operation of the machine as a whole as used in an orchard.

At the start the tilling implement, in this instance a plow, is positioned to the extreme right of the machine as shown in Fig. 5. The ground is now being worked close to a row of trees whose positions are indicated at 155, and the entire orchard is plowed once around with the plows in this position. The plows now being set on the center or draft line of the engine as shown in Fig. 1 the ground between the trees is worked. The plows are then shifted to the extreme left of the machine as shown in Fig. 4 and the last round is made and the plowing finished with the rear plow working close to the trees indicated at 156. When the various parts are properly set furrow wheel 71 will always follow in the furrow formed by the rear plow as indicated by the dotted line E. If handle 73ª is operated and wheel 71 set at an angle to the draft line of the engine as indicated at 71ª in Figs. 4 and 5, the advancing machine will, through the medium of rod 75 and arm 74, gradually force said wheel to resume a position parallel to the draft line of said engine and indicated by said line E.

It is understood of course that changes in construction and operation may be made within the scope of the appended claims, and that any desired implement may be used in place of the plows shown without departing from the spirit of my invention.

Having thus described my invention, what I claim as new and desire to secure by Letters Patent, is,—

1. An earth tilling machine comprising a draft engine, a frame pivotally connected thereto at a centrally disposed vertical axis and positively adjustable about said axis, a furrow wheel operatively mounted upon the rear end of said frame and mounted to operate about a vertical pivot, means for adjusting said furrow wheel at an angle to the draft line of said engine, mechanism connecting said furrow wheel and said engine for automatically adjusting said furrow wheel parallel with the draft line of said engine when said engine is advancing, and an earth tilling implement pivotally connected to said frame at a point adjacent said furrow wheel and positioned between said furrow wheel and said engine and laterally adjustable about said pivotal point.

2. An earth tilling machine comprising a draft engine, a frame pivotally connected thereto at a centrally disposed vertical axis and positively adjustable about said axis, a furrow wheel operatively mounted upon the rear end of said frame and mounted to operate about a vertical pivot, means for adjusting said furrow wheel at an angle to the draft line of said engine, mechanism connecting said furrow wheel and said engine for automatically adjusting said furrow wheel parallel with the draft line of said engine when said engine is advancing, and a vertically adjustable earth tilling implement pivotally connected to said frame at a point adjacent said furrow wheel and positioned between said furrow wheel and said engine and laterally adjustable about said pivotal point.

3. The combination of a draft engine, a frame pivotally connected thereto, a second frame carrying an earth tilling implement and pivotally connected to said first mentioned frame, a furrow wheel operatively and pivotally mounted on said first mentioned frame, means for pivotally adjusting said furrow wheel at an angle to the draft line of said engine, and mechanism connecting said furrow wheel and said engine for automatically adjusting said furrow wheel parallel with the draft line of said engine.

4. The combination of a draft engine, a frame pivotally connected thereto, a second frame carrying an earth tilling implement and pivotally connected to said first mentioned frame and vertically adjustable therein, mechanism for vertically adjusting said second mentioned frame, mechanism for pivotally adjusting the same, and means for causing said tilling implement to automatically assume a position parallel to the draft line of said engine, said means comprising a furrow wheel operatively and pivotally mounted on said first mentioned frame, means for pivotally adjusting said furrow wheel at an angle to the draft line of said engine, and mechanism connecting said furrow wheel and said engine for automatically adjusting said furrow wheel parallel with the draft line of said engine when said engine is advancing.

5. An earth tilling machine, comprising, a draft engine, a frame pivotally connected thereto at a centrally disposed axis and capable of positive lateral adjustment about said axis, a furrow wheel pivotally and operatively mounted on said frame, a laterally adjustable earth tilling implement pivotally connected to said frame, manually operated means for positioning said furrow wheel at an angle to the draft line of said earth tilling implement, and mechanism connecting said furrow wheel and said engine for automatically adjusting said furrow wheel parallel with the draft line of said earth tilling implement when said material is advancing.

6. The combination of a draft engine and a frame pivotally connected thereto, said frame having a furrow wheel and a vertically adjustable frame carrying an earth tilling implement operatively mounted thereon, and means for effecting said vertical adjustment of said frame, said means comprising engine operated hoisting mechanism operatively connected thereto, an adjustable stop operatively positioned at the forward end thereof and an adjusting gage operatively positioned at the rear end thereof.

7. The combination of a draft engine and a frame pivotally connected thereto, said frame having a furrow wheel and a vertically adjustable frame carrying an earth tilling implement operatively mounted thereon, and means for effecting said vertical adjustment of said frame, said means comprising engine operated hoisting mechanism operatively connected thereto, an adjustable stop operatively positioned at the forward end thereof and an adjusting gage operatively positioned at the rear end thereof, said gage comprising a bell crank lever pivotally mounted on said first mentioned frame and provided with locking mechanism at one end thereof and a member slidably mounted in the rear end of said first mentioned frame and adapted to engage said lever and the rear end of said second mentioned frame.

8. An earth tilling machine comprising, a draft engine, a frame pivotally connected thereto at a centrally disposed axis and capable of positive lateral adjustment about said axis, a laterally adjustable earth tilling implement pivotally connected to said frame, and means for causing said frame and said implement to assume a predetermined position with relation to said engine when said machine is advancing, said means comprising a furrow wheel pivotally mounted on said frame and having an arm revolubly mounted on the pivot thereof, a worm gear secured to said pivot adjacent said arm, a worm operatively mounted in said arm and meshing with said worm gear, manually operated means for operating said worm gear, a rod pivotally connected to said arm at one end and pivotally connected to said draft engine at a point adjacent said centrally disposed axis at the other end.

9. An earth tilling machine comprising a draft engine, a frame pivotally connected thereto at a centrally disposed axis and capable of positive lateral adjustment about said axis, manually operated means for effecting said lateral adjustment when steering, independent means for positively positioning said frame in predetermined relation to said engine when advancing, a positively adjustable earth tilling implement pivotally connected to the rear end of said frame, and independent means for effecting said positive adjustment.

10. The combination of a draft engine and a frame pivotally connected thereto, said frame having a furrow wheel and a vertically and laterally adjustable frame carrying an earth tilling implement operatively mounted thereon, and means for effecting said lateral adjustment of said frame, said means comprising a manually operated, vertically adjustable, rack and pinion mechanism operatively connected thereto.

11. The combination of a draft engine and a frame pivotally connected thereto at a centrally disposed vertical axis, said frame having a furrow wheel and a vertically and laterally adjustable frame carrying an earth tilling implement pivotally connected thereto, and means for vertically adjusting said second mentioned frame, said means comprising a vertically adjustable pivot positioned adjacent said furrow wheel and about which said second frame operates, a pulley fixed to said first mentioned frame, a pulley positioned in fixed relation to said pivot and movable therewith, a cable passing over said pulleys and attached to said first mentioned frame, a vertically adjustable guide mounted on said first mentioned frame and carrying the forward end of said second mentioned frame, a pulley positioned on said first mentioned frame above said guide, a cable secured to said guide and passing over said pulley, both of said cables being connected to a common power operated cable.

12. A pair of motor driven traction wheels having a frame pivotally mounted thereon and carrying the driving mechanism thereof, a second frame pivotally connected to said first mentioned frame at a centrally disposed vertical axis and positively adjustable about said axis, a furrow wheel operatively mounted on said second mentioned frame, and a vertically adjustable third frame carrying an earth tilling implement pivotally connected to said second mentioned frame and positioned between said furrow wheel and said first mentioned frame and laterally adjustable about said pivotal connection.

In testimony whereof I have hereunto affixed my signature this 27th day of October, 1916.

JOHN A. OSTENBERG.